Oct. 22, 1963  B. N. SNYDER ETAL  3,107,762
MANUALLY OPERABLE CONTROLS
Filed Nov. 23, 1959  7 Sheets-Sheet 1

INVENTORS
Benjamin N. Snyder,
Homer V. Krautwurst,
Joseph M. McDonnell &
BY Richard D. Williams Hugh L. Fisher
ATTORNEY

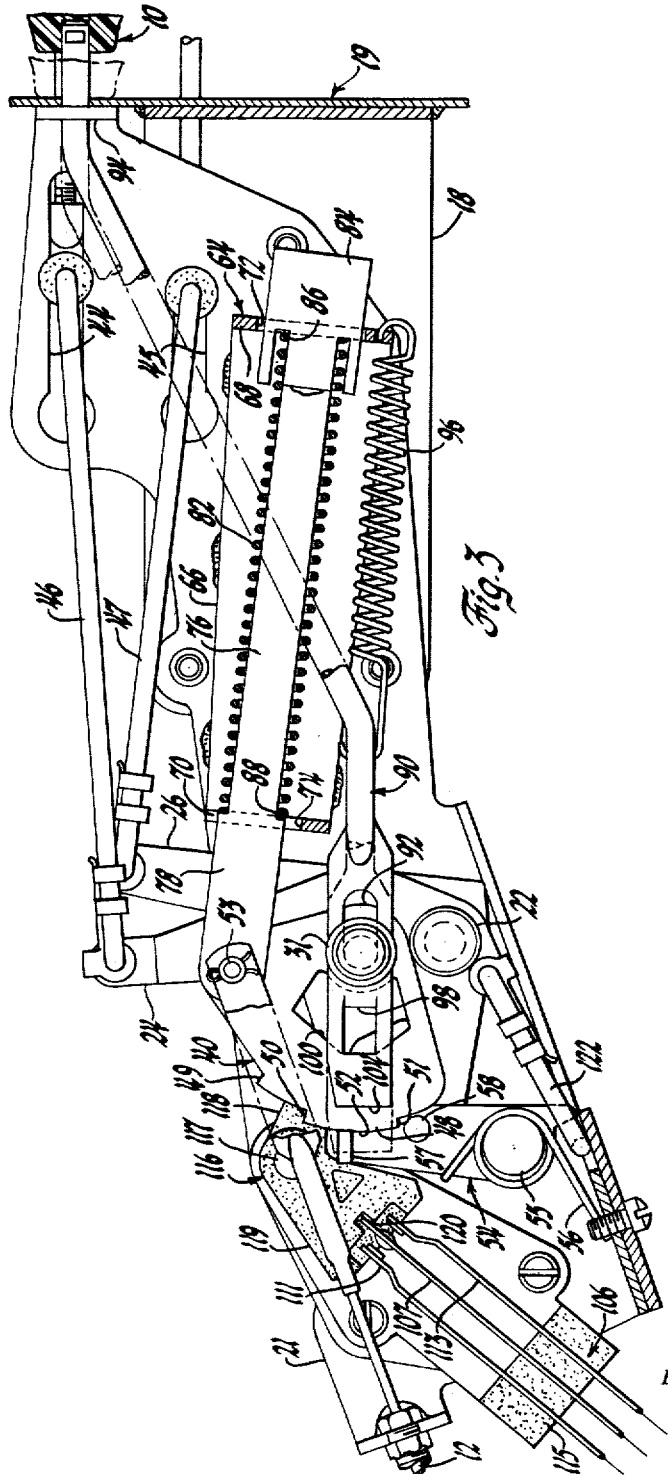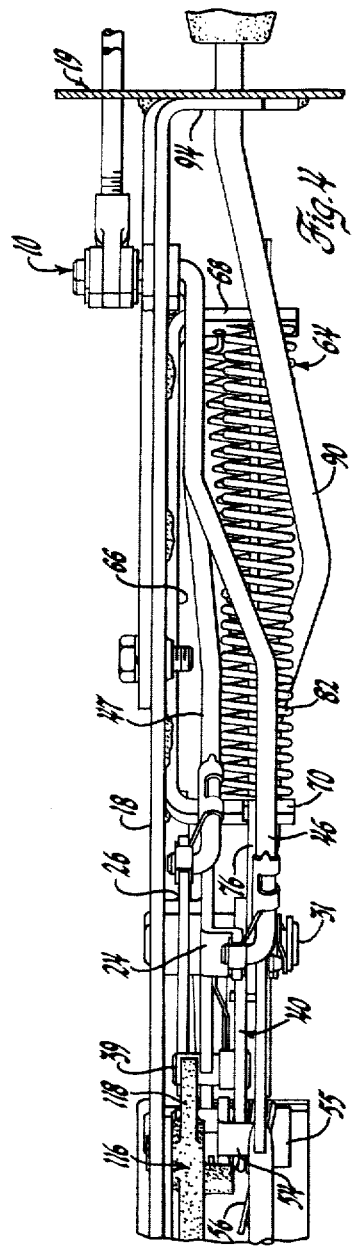

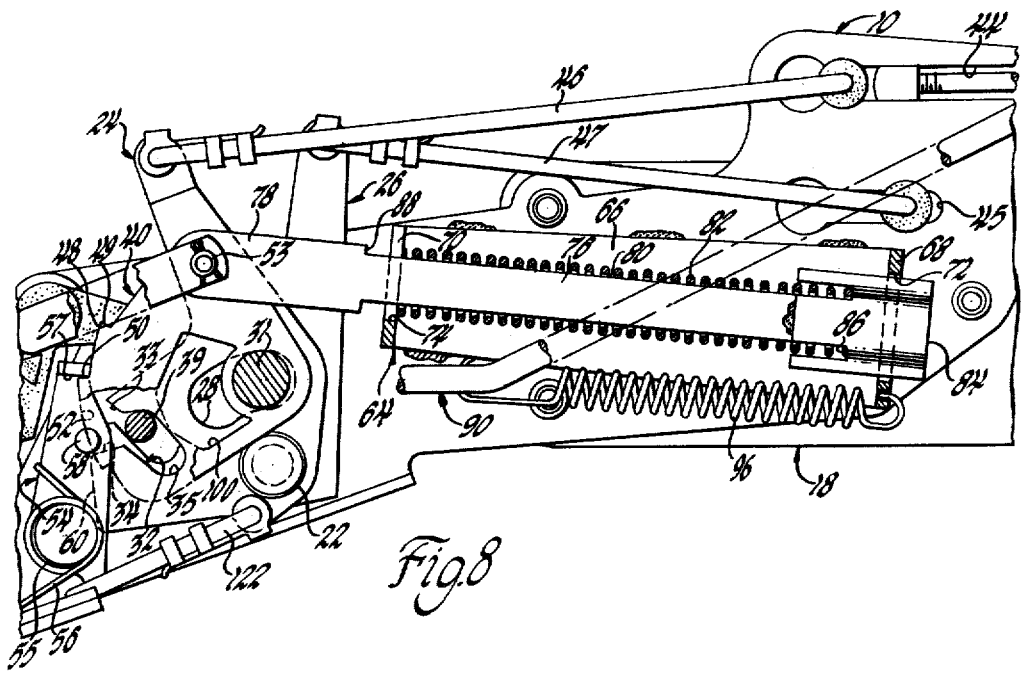

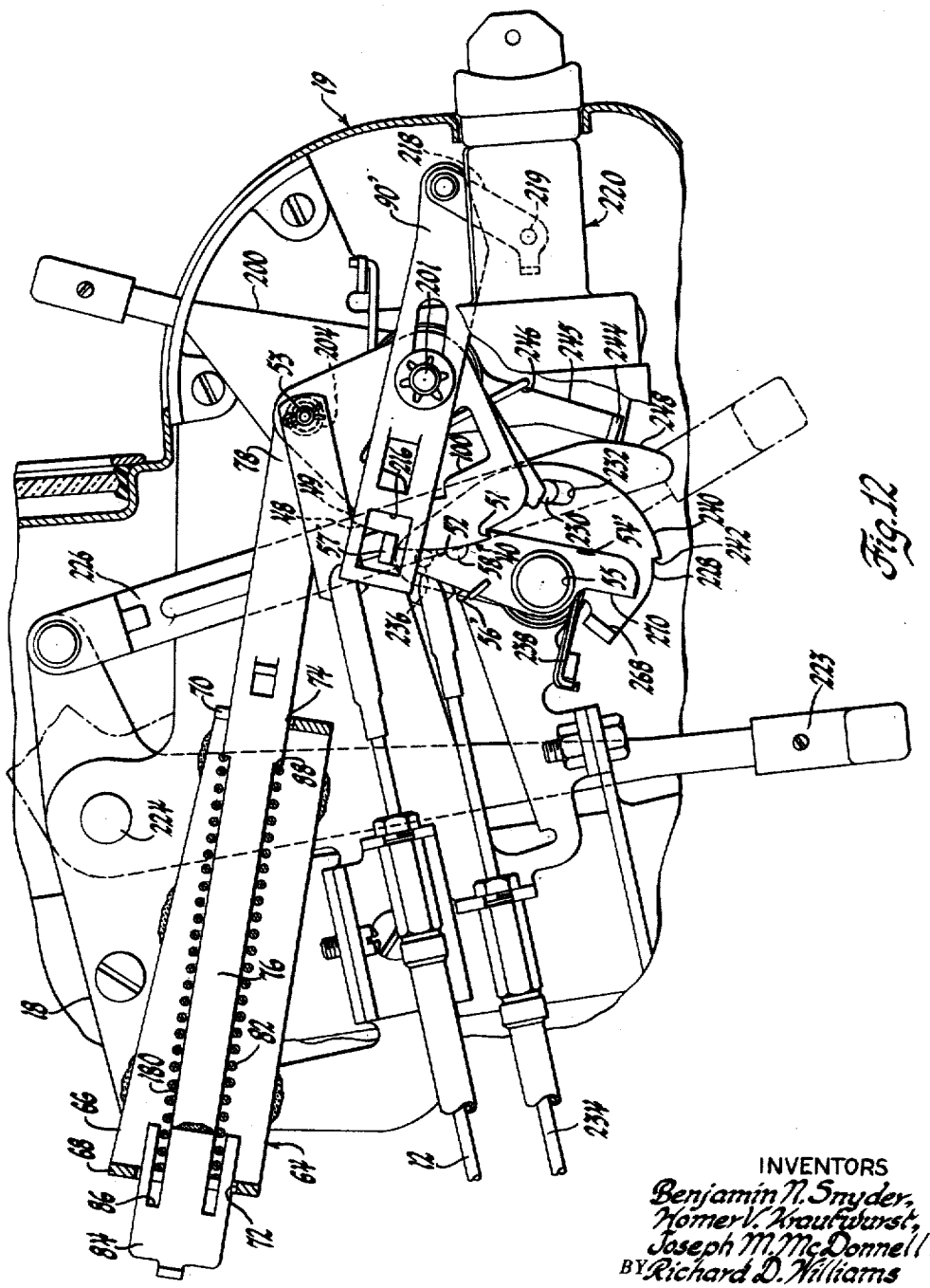

Oct. 22, 1963  B. N. SNYDER ETAL  3,107,762
MANUALLY OPERABLE CONTROLS
Filed Nov. 23, 1959  7 Sheets-Sheet 7
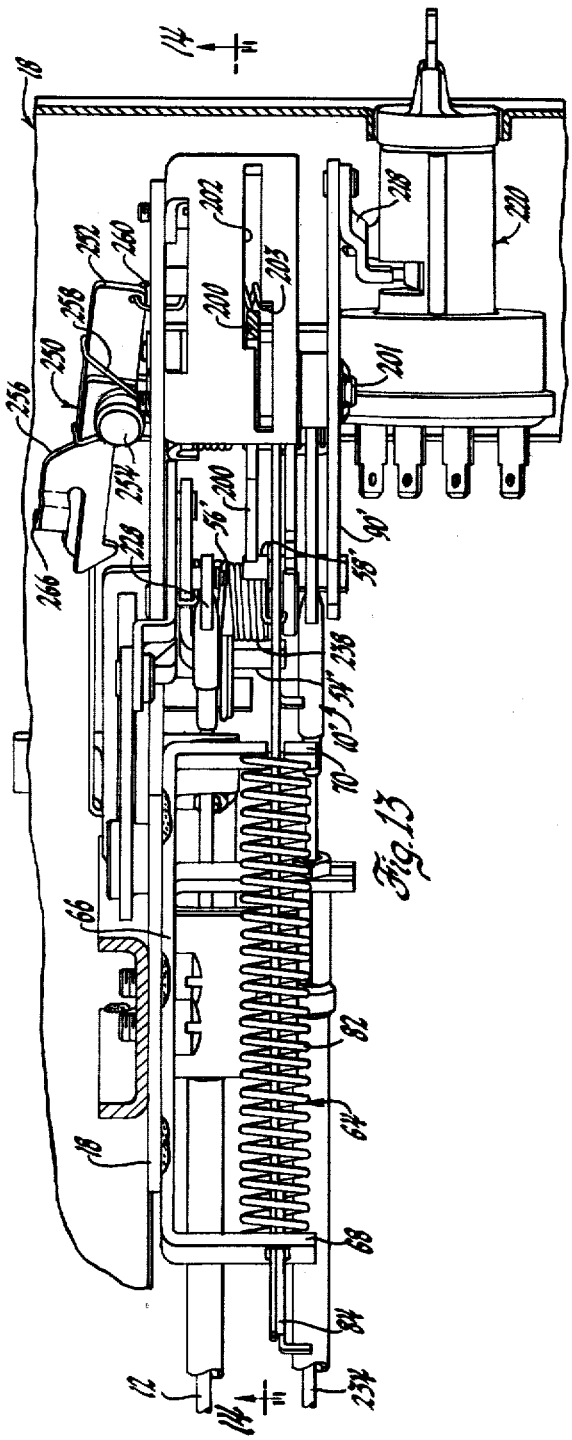
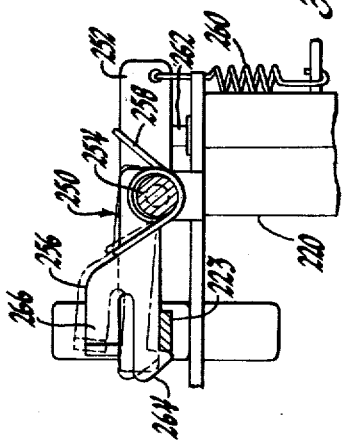
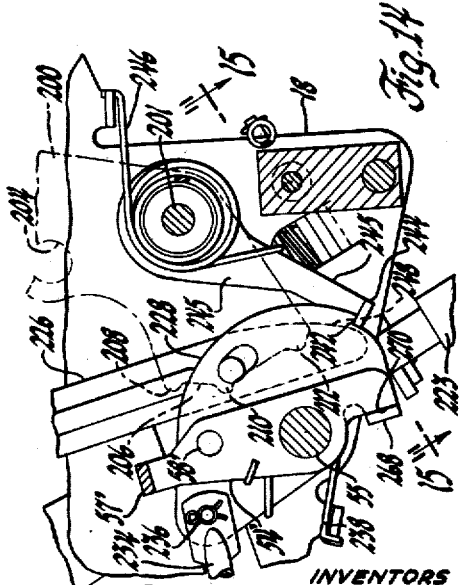
INVENTORS
Benjamin N. Snyder,
Homer V. Krautwurst,
Joseph M. McDonnell, &
BY Richard D. Williams
Hugh L. Fisher
ATTORNEY

United States Patent Office 3,107,762
Patented Oct. 22, 1963

3,107,762
MANUALLY OPERABLE CONTROLS
Benjamin N. Snyder, Homer V. Krautwurst, and Joseph M. McDonnell, Rochester, and Richard D. Williams, Fairport, N.Y., assignors to General Motors Corporation, Detroit, Mich., a corporation of Delaware
Filed Nov. 23, 1959, Ser. No. 854,812
30 Claims. (Cl. 192—4)

This invention relates generally to manually operable controls, and particularly to controls of the character adapted, although not exclusively, for use with vehicle transmissions.

In general, any manually operable control should be made conveniently accessible to the operator, capable of effortless operation, and maneuverable according to uncomplicated schemes or patterns, i.e., the pattern of movement should be such as to not require special training and should conform to the normal reflex action of the average operator. To explain further, the movements of the control, if intended to determine direction, should conform to these directions; for example, maneuvering a vehicle transmission control forwardly should also cause forward vehicle movement. Consequently, if an emergency arises, the fact that an operator will normally react in a certain manner can be utilized to overcome the suddenly arising problem. Additionally, a control, meeting these requirements, would be of slight commercial significance unless the structures involved were suited for mass production according to accepted techniques.

It is, therefore, one of the objectives of this invention to provide such a control.

Other concerns somewhat peculiar to automatic transmission controls, particularly if cable operated, are adequate leverage and proper "feel" for each control setting. With the linkage type of control, i.e., linkage used in place of a cable to transfer movements between the transmission and the control, leverage for effortless operation can be produced by varying the lengths of the various levers in a known manner. However, a cable precludes this, and it is necessary to provide leverage in some other way. Also, if a cable is used, the provision of a sensation to the operator for advising when each setting is properly established is a problem. If a detent provision is made in the transmission, slack or lost motion from the cable can often produce erroneous sensations.

Therefore, the invention contemplates a control that incorporates a novel detent provision therein for releaseably maintaining each setting and that has a unique provision for enabling considerable leverage to be built into the control.

It is advantageous in any control to provide some mode of establishing a Neutral or Off setting without the need for extreme sensitivity on the part of the operator or some special education. To explain further, and this would be applicable whether one or several control members are included in the control, it is desirable that a very simple act as the pushing of a member or some other action that is inherently demanded of the control be required to insure that the control is placed in the Neutral setting. For example, it is helpful particularly at night if a vehicle transmission be placed by this type of simple act in the Neutral setting without having to maneuver the transmission control member to different settings in order to ascertain which setting is the Neutral setting.

With this problem in mind, the invention seeks to provide a control that causes a Neutral or Off setting to be established by a single and simple maneuver. Specifically, it is proposed that the starting of the vehicle engine be preceded by, and be a part of, the establishment of Neutral status of the transmission.

When a control such as an automatic transmission control employs plural control levers, there is always the problem of ascertaining what position each is in, especially at night. To overcome this problem, the invention affords a provision whereby a single simple maneuver of one control member will place the other control member in an Off setting.

Inadvertent or accidental operation of a control is always a possibility and can often produce serious damage. For instance, if in a vehicle transmission control, it is possible to establish Reverse drive when proceeding forwardly, or establish a Park setting for engaging a positive parking brake, when proceeding at a rapid speed, obviously serious damage can result to the transmission. Additionally, theft of a vehicle is always a possibility since it is quite easy to by-pass the conventional ignition switch and complete the engine starting motor circuit without an ignition key.

Consequently, another important objective of the invention is to provide a unique arrangement for preventing unintended operation of the control.

Also, the invention contemplates a provision for locking the control in a predetermined setting. Specifically, the arrangement enables the transmission parking brake control to be locked in the Park position when the ignition is moved to the Off position.

The foregoing and other objectives and advantages of the invention will become apparent from the following description and the accompanying drawings in which:

FIGURE 3 is an enlarged detailed view of the control shown in the Neutral setting;

FIGURE 4 is a top view of the FIGURE 3 control;

FIGURE 8 is a view similar to FIGURE 5 but with the control in the Forward setting;

Figure 1:
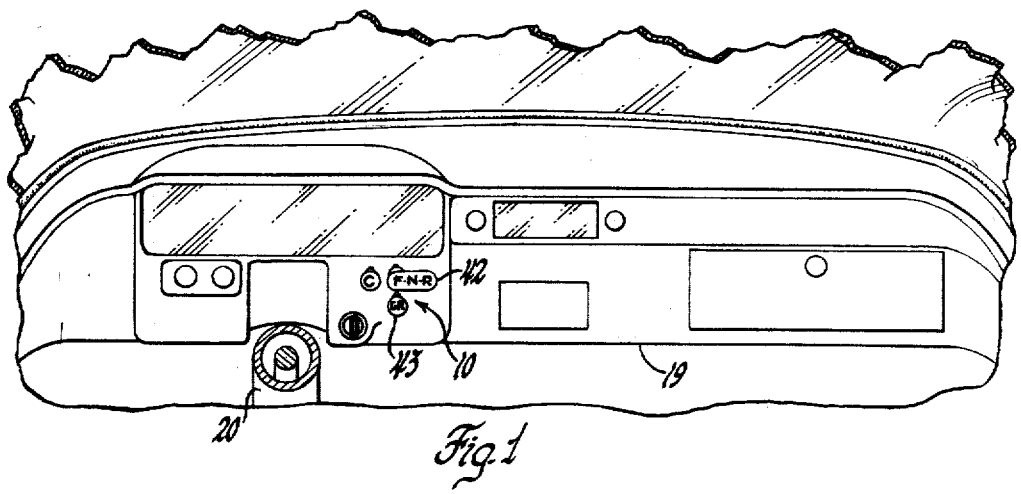
FIGURE 1 is a view showing mounted on a vehicle instrument panel a control incorporating the principles of the invention.
Figure 2:
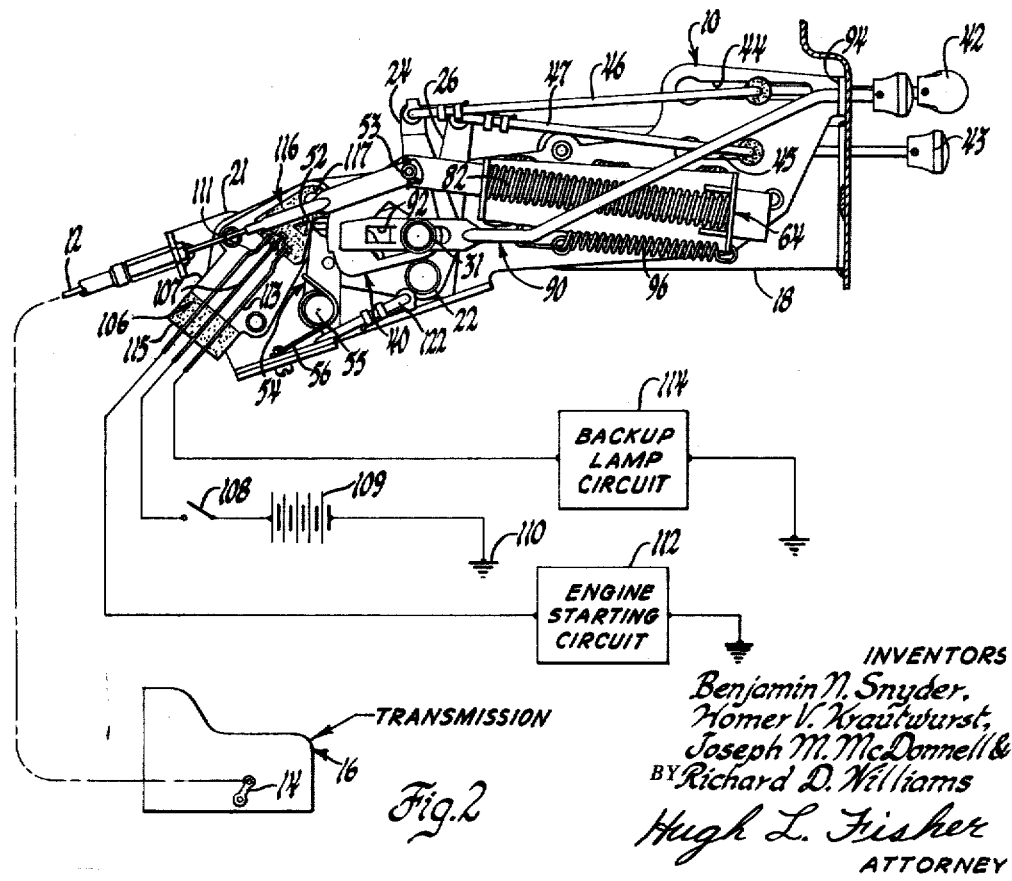
FIGURE 2 is a detailed view of the control showing the relationship thereof to the transmission and various accessory operating circuits.
Figure 10:
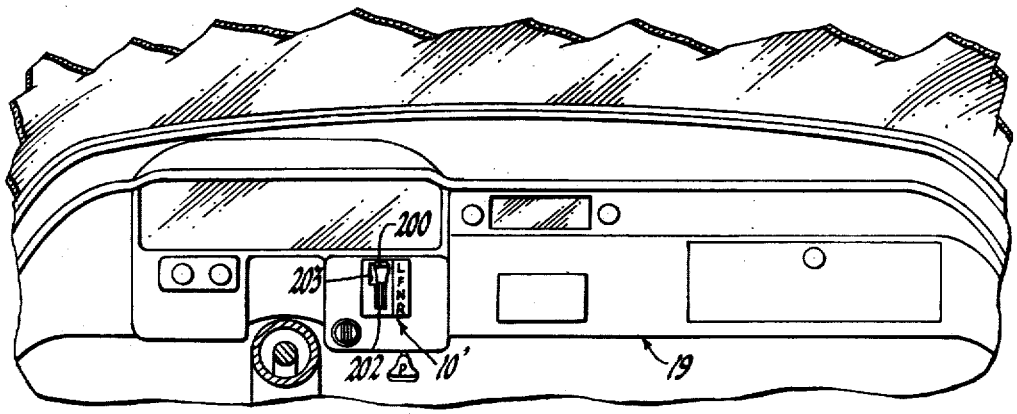
Figure 11:
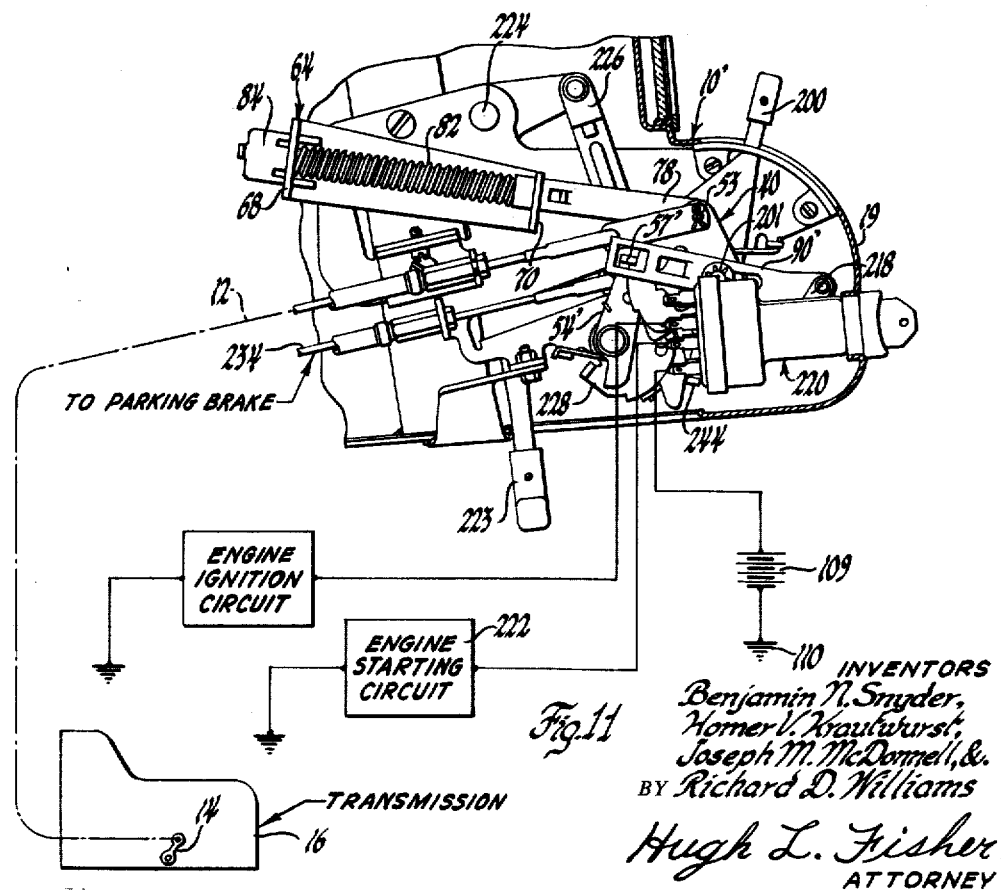

FIGURE 9 demonstrates the control in the Grade Retard setting;

FIGURE 10 is a view similar to FIGURE 1 showing mounted on the vehicle instrument panel a modified control;

FIGURE 11 is a view similar to FIGURE 2 of the modified control;

FIGURE 12 is an enlarged detailed view of the modified control;

FIGURE 13 is a top view of the FIGURE 12 control;

FIGURE 14 is a fragmentary view of the control taken along line 14—14 of FIGURE 13; and FIGURE 15 is a fragmentary view of a locking device for the control taken along line 15—15 of FIGURE 14.

Referring to the drawings, and particularly to FIGURES 1 and 2, the transmission shifter control, denoted generally at 10, is so arranged as to be connected, preferably, through a cable 12 with an external lever 14 mounted on a transmission 16. Movement of this external lever 14 by the selector control 10 may be utilized to change the transmission settings in any well known manner.

The selector control 10 comprises a bracket or base plate 18 attached to some part of the vehicle, such as the instrument panel 19, and may be situated, e.g., as viewed in FIGURE 1 to the right of the steering column 20 so as to be accessible for righthand operation. Of course, if preferred, the control 10 may be on the opposite side for lefthand manipulation, or in a position convenient to either hand. For reasons to be explained, the base plate 18, when in place, has the front end 21 facing towards the front of the vehicle and is in parallel alignment with the longitudinal axis of the vehicle. Pivoted on a pin 22 secured to the base plate 18 are a main or Forward, Neutral and Reverse (FNR) lever 24 and a secondary or Grade Retard (GR) lever 26. The FNR lever 24 has Forward Drive, Reverse Drive, and Neutral or Off settings and the GR lever 26 has Grade Retard and Neutral or Off settings, all representing transmission statuses. The GR lever 26 may be employed to establish a Low Drive Range, if desired, instead of the Grade Retard, which is for transmission braking. The amount of pivotal movement of these levers 24 and 26 is limited respectively by the extent of slots 28 and 30, both of which envelope a pin 31 attached to the base plate 18.

As viewed in FIGURES 8 and 9, the FNR lever 24 is provided with a control surface 32 comprising an upper edge 33, a bottom edge 34, and an irregularly shaped notch 35 situated between these edges 33 and 34, whereas the GR lever 26 is afforded a control surface 36 made up of an arcuate portion 37 and a notched portion 38. These control surfaces 32 and 36 coact with a follower as projecting pin 39 affixed to a cam arrangement as the detent cam, indicated generally at 40, and revolvably supported on the pin 31.

The FNR and GR levers 24 and 26 may be actuated directly, or by the linkage demonstrated in FIGURE 2 if straight line movement is wanted. To produce the straight line motion, a FNR button 42 and a GR button 43 are, respectively, slidably positioned within substantially straight tracks 44 and 45 in a flange section of the base plate 18. A link 46 pivotally interconnects at opposite ends the rod end of the FNR button 42 and the FNR lever 24, whereas a link 47 provides the same type connection between the rod end of the GR button 43 and the GR lever 26. Thus, as the buttons 42 and 43 are slidably moved fore and aft, the links 46 and 47 will pivot the cooperating levers 24 and 26. This fore and aft movement of the FNR lever 24 is significant since the lever 24 is moved in the direction of desired vehicle movement, i.e., forward when forward vehicle movement is wanted and backwards for reverse movement.

The detent cam 40 is provided, along a cam or edge surface 48 thereof, with a series of stops, as notches 49, 50, and 51 corresponding, in this order, to the Grade Retard, Forward Drive and Reverse Drive transmission settings of the FNR and GR levers 24 and 26. A Neutral setting is denoted at 52 and is approximately intermediate the notches 50 and 51. When the detent cam 40 is revolved, this movement, as will be explained, is transferred to the cable 12, which has the upper end thereof connected to a pin 53, affixed to the detent cam 40.

Each of the notches 49, 50, and 51 in the detent cam 40 coact with a detent provision, such as a detent or latch arm 54, which is pivotally supported on a pin 55 joined to the base plate 18 and which is biased towards the detent cam edge surface 48 by a spring 56. An outwardly and transversely extending tab 57 is arranged to engage these notches so as to maintain the detent cam 40 in the selected setting. A releasing or camming pan 58, attached to the latch arm 54, is arranged to engage the FNR lever and GR lever nose portions 60 and 62 during certain phases of operations, to be described, thereby forcing the latch arm 54 counterclockwise, as viewed in FIGURE 2, to an unlatched position.

For returning the detent cam 40 to the Neutral setting whenever desired, and for biasing the detent cam notches 49, 50, and 51 into snug engagement with the latch arm tab 57, a neutral centering spring device 64 is furnished. This device 64, as shown in FIGURES 3 and 4, includes a U-shaped bracket 66, the legs 68 and 70 of which are afforded respectively with slots 72 and 74. A plate centering arm 76 is slidably situated within these slots 72 and 74 and has an end 78 attached to the detent cam pin 53. The centering arm 76 is formed with a reduced section 80, which is surrounded by an elongated coil spring 82. A retainer 84 is connected to the end of the centering arm reduced section 80 and provides a shoulder 86 against which one end of the spring 82 abuts, whereas the opposite end of the spring 82 engages a shoulder 88 separating end 78 and reduced section 80.

Preferably, so as to have no tolerance effect, the bracket 66 is secured in place on the base plate 18 as a completed sub-assemblage with the retainer 84 in position. The shoulders 86 and 88 then will coincide with the inside edges of the bracket arms 68 and 70, and the spring 82 will be preloaded a predetermined amount. Therefore, variations in the components of this sub-assemblage will be inconsequential since the desired preload can be incorparated before the retainer 84 is installed. In order to properly connect the centering arm end 78 to the detent cam pin 53, it is necessary to align the bracket 66 on the base plate 18 so that the detent cam 40 is in the Neutral setting relative to the latch arm tab 57, and then the bracket 66 may be affixed to the plate 18. This furnishes an opposing bias to rotation of the detent cam 40 either in the clockwise or counterclockwise directions, as well as eliminates the influence of manufacturing tolerances on accuracy of the device 64.

Figure 7:
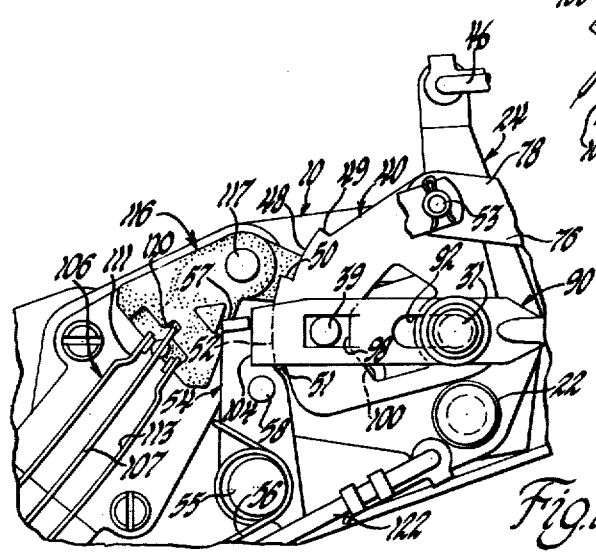
FIGURE 7 is a view similar to FIGURE 6 showing the switch device when the control is in the Neutral setting and the engine is being started.

Cooperating with the neutral centering spring device 64 is a neutralization or cancellation slide 90, seen in FIGURE 2, and constructed to produce the Neutral setting of the detent cam 40 at any time it is wanted. Cancellation slide 90 is slidably mounted on the base plate 18 and one end through the coaction of a slot 92 and the pin 31 and at the opposite end by apertured guide tab 94. A spring 96 urges the slide 90 rearwardly and to an Off position. Forwardly of the slot 92 an ear is lanced inwardly, as depicted in FIGURE 7, so as to extend into an irregularly shaped slot 100 in the detent cam 40, the function of which is to limit relative movement between the slide 90 and the detent cam 40 under certain conditions to be explained. An extreme forward end 104 of the slide 90 is adapted, when the slide 90 is moved forwardly, to engage the tab 57 on the latch arm 54 and force the latch arm 54 out of engagement with whichever notch it is in engagement at the time. When the latch arm 54 is moved to the unlatched position, then, the neutral centering spring device 64 becomes effective to move the detent cam 40 to the Neutral setting illustrated and will carry therewith the FNR and GR levers 24 and 26, as will become apparent.

Figure 6:
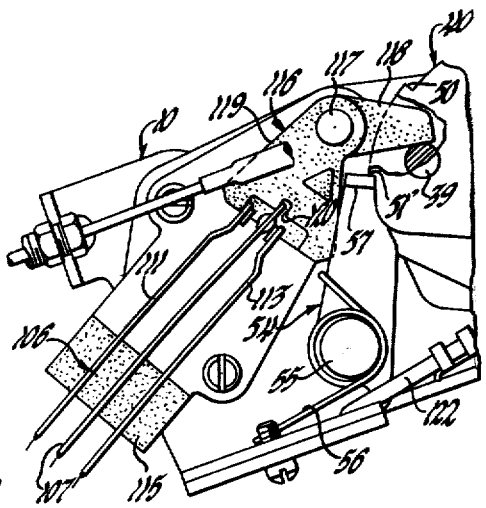
FIGURE 6 is a view of a switch device shown in the Reverse setting of the control.

As best shown in FIGURES 2, 6, and 7, a switch device, indicated generally at 106, is joined to the base plate 18 adjacent and forward of the latch arm 54. The switch device 106 has a main contact 107 connectible through an ignition switch 108 to a suitable source of voltage, such as the vehicle battery indicated at 109 and grounded at 110. Positioned on opposite sides of main contact 107 are an engine starting contact 111, which extends to an engine starting motor circuit 112, and a backup light contact 113 extending to a backup light circuit 114. These contacts are each flexible, are spaced apart a predetermined distance, and are isolated from the base plate 18 by an insulator, denoted generally at 115. The main contact 107 pivots about the insulator 115 in opposite directions so as to engage either the starter contact 111 or the backup light contact 113. When the contacts engage, because of their flexibility, relative sliding movement between the engaging surfaces takes place, which sliding movement aids in keeping these surfaces clean.

Pivoting of the main contact 107 is accomplished through a bellcrank lever 116, which is pivoted on a pin 117 affixed to the base plate 18 and which is made of suitable insulating material. A leg 118 of the bellcrank lever 116 is positioned in the path of movement of the detent cam projecting pin 39 so that when the detent cam 40 is revolved clockwise to the Reverse Drive setting displayed in FIGURES 5 and 6, the projecting pin 39 will engage the leg 118 and rock the bellcrank lever 116. Another leg 119 of the lever 116 is formed with a slot 120 that receives the end of the main contact 107, and hence, this rocking movement will force the main contact 107 into engagement with the backup light contact 113, thereby completing the backup light circuit 114. To rotate the bellcrank lever 116 in the opposite direction so as to shift the main contact 107 into engagement with the starter contact 111, the cancellation slide 90 is moved forwardly whereupon the edge 104 will force the tab 57 on the latch arm 54 into engagement with the bellcrank lever leg 119 and revolve the lever 116 as viewed in FIGURE 7. Because of the configuration of the slot 100 and the detent cam 40, the only time that the cancellation slide 90 can be moved far enough to complete the engine starting motor circuit 112 is with the detent cam 40 in the Neutral setting. Therefore, the Neutral setting of both the FNR and GR levers 24 and 26 must be established prior to cranking the engine, a desirable feature. Then, the cancellation slide car 98 is permitted by the detent cam slot 100 to travel the necessary maximum distance.

Figure 5:
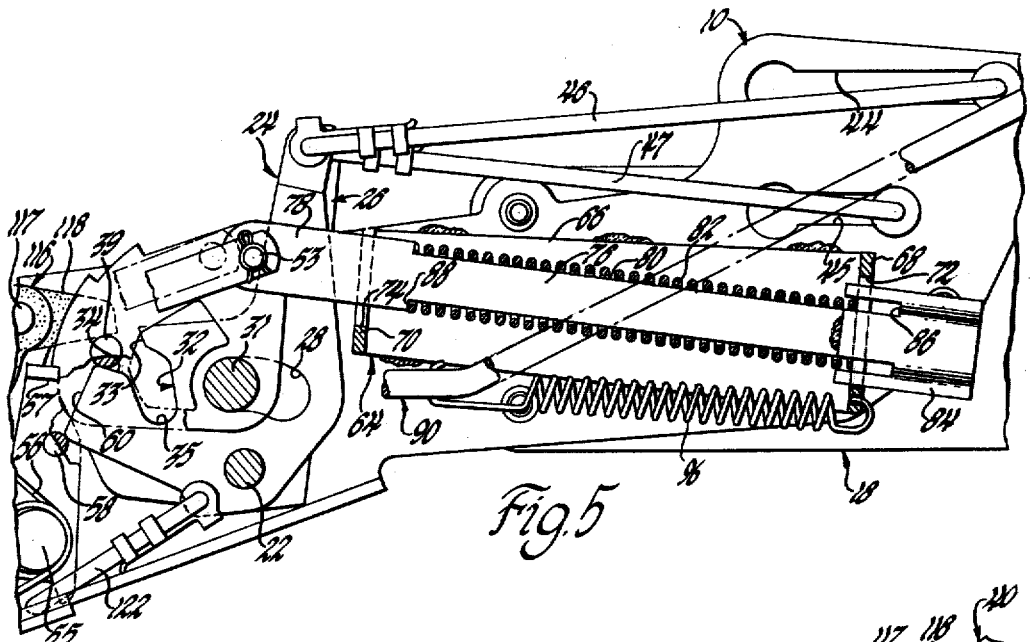
FIGURE 5 is a view of the control shown in the Reverse setting.

The operation of the shifter control 10 is as follows. Assume first, that the cancellation slide 90 has been actuated in the aforedescribed manner to shift both the FNR lever 24 to the Neutral setting and the GR lever 26 to the Off position and that the engine has been started by the completion of the starting motor circuit 112. If the driver wants to back up, the FNR lever 24 is pivoted rearwardly to the Reverse Drive setting. Consequently, the bottom edge 34 of the FNR lever control surface 32 will engage the detent cam pin 39 and revolve the detent cam 40 clockwise until the latch arm tab 57 engages the Reverse Drive setting notch 51 as depicted in FIGURE 5. This movement of the detent cam 40 will be transferred by cable 12 to the transmission external lever 14 so as to condition the transmission 16 for Reverse Drive and will also actuate the neutral centering spring device 64 thereby compressing spring 82. Spring 82 will now exert a bias that attempts to revolve the detent cam 40 counterclockwise, and therefore, will maintain notch 51 in snug engagement with the latch arm tab 57, a helpful aid in preventing rattles. Rotation of the projecting pin 39 will, as has been described, also rock the bellcrank lever 116 thereby completing the backup light circuit 114.

To move the vehicle forwardly, the FNR lever 24 is pushed forwardly from the Reverse Drive setting and to the Forward Drive setting displayed in FIGURE 8. The initial push will cause the FNR lever nose portion 60 to engage the latch arm camming pin 58 and move the latch arm 54 to the unlatched position. The detent cam 40 will not have moved yet since the upper edge 33 of the FNR lever control surface 32 is displaced a predetermined distance from the detent cam projecting pin 39 and therefore allows some lost motion. However, as soon as the latch arm 54 is moved from the notch 51, the stored energy from spring 82 will quickly, with a snap action, return the detent cam 40 to the Neutral setting. While so returning to the Neutral setting, the detent cam projecting pin 39 will engage the bottom edge 34 of the FNR lever control surface 32 and carry therewith the FNR lever 24. Upon pushing the FNR lever 24 further and to the Forward Drive setting, the upper edge 33 of the FNR lever control surface 32 will move into engagement with the projecting pin 39 and rotate the detent cam 40 to the Forward Drive setting. In the Forward Drive setting, the latch arm tab 57 engages notch 50 and the spring 82 for the device 64 and is again compressed, but now tends to urge the detent cam 40 in the opposite direction, i.e., clockwise, to the Neutral setting.

To return the FNR lever 24 to the Neutral position shown in FIGURE 2, the latch arm 54 must be released and this takes place in somewhat the same manner as when the FNR lever 24 was removed from the Reverse Drive setting, just described. Since the pin 39 is displaced a predetermined distance from the FNR lever control surface bottom edge 34, the FNR lever 24 can be rotated an initial distance, as before, during which the nose 60 thereof will again engage the latch arm camming pin 58 and move the latch arm 54 to an unlatched position with respect to the notch 50. The FNR lever 24, then, will be quickly returned to the Neutral setting by the neutral spring centering device 64 since, when the detent cam 40 returns to the Neutral setting, the projecting pin 39 will engage the upper edge 33 of the FNR lever control surface 32 and carry therewith the FNR lever 24.

When the FNR lever 24 is in either the Neutral or Reverse Drive setting, the GR lever 26 cannot be moved. This is because the arcuate portion 37 of the control surface 36 on the GR lever 26 encounters the edge of the projecting pin 39 at a point along a line extending through the centers of pins 39 and 31. The line of action resulting from attempts to rotate the GR lever 26 is coincident with this line extending through the centers of pins 39 and 31, thus producing, in effect, a rotation resisting strut. Hence, the GR lever cannot be moved. To actuate the GR lever 26, the FNR lever 24 must be placed in the Forward Drive setting, in which setting the detent cam projecting pin 39 is within both the irregularly shaped notch 35 in the control surface 32 on the FNR lever 24 and in the entrance of the notched portion 38 of the GR lever control surface 36. The GR lever 26 can now be urged forwardly and will carry therewith the detent cam projecting pin 39 forcing it further into both the notch 35 and the notched portion 38 until the latch arm tab 57 engages notch 49.

With the GR lever 26 in the Grade Retard setting viewed in FIGURE 9, the FNR lever 24 cannot be moved to either the Neutral or Reverse Drive settings since the FNR lever notch 35 engages projecting pin 39 at a point coincident with a line extending through the centers of pins 31 and 39. This line of action renders the FNR lever 24 ineffective to move the detent cam 40 in a way similar to that preventing movement of the GR lever 26 when the FNR lever 24 is out of the Forward Drive setting.

In order to return the GR lever 26 to the Off setting, the lost motion principle is again utilized, the lost motion being possible because the notched portion 38 is larger than the projecting pin 39. This permits the GR lever 26 to be rotated an initial distance before the bottom edge of the notched portion 38 engages the projecting pin 39. During this initial travel, the nose 62 will, in the manner of the nose 60 of the FNR lever 24, engage the latch arm camming pin 58 and force the latch arm 54 away from the notch 49 just far enough to allow the neutral centering spring device 64 to revolve the detent cam 40 until the latch arm tab 57 engages the Forward Drive setting notch 50. While the detent cam 40 revolves, the projecting pin 39 will engage the upper part of the GR lever control surface notched portion 38 and carry the GR lever 26 to the Off setting.

Another provision is made for returning the GR lever 26 to the Off setting and that is by applying to the FNR lever 24 a slight forward push, which will revolve the FNR lever 24 a predetermined distance counterclockwise. This motion is transferred by a link 122 (see FIGURE 9) interconnecting the bottom of the FNR lever 24 with the bottom of the latch arm 54, whereupon the latch arm tab 57 will be revolved out of engagement with notch 49 in the detent cam surface 48. The centering spring device 64 becomes effective to revolve the detent cam 40 until the notch 50 engages the latch arm tab 57. This aspect permits a quick and easy release of the Grade Retard setting simply by nudging the FNR lever 24. Moreover, this provides the driver with a reminder that establishes the Forward Drive setting without any necessity to look at the levers, a useful feature particularly for night driving.

The modification of the control displayed in FIGURES 10 and 11 and assigned the numeral 10' has many components that are substantially the same as those described with respect to the FIGURE 1 control. Therefore, those parts common to both controls 10 and 10' will be denoted by the same numerals.

As can be seen in the figures, the control 10' employs a single control lever 200 that is revolvably mounted on a shaft 201 connected to base plate 18. Preferably, and as will become apparent, the control lever 200 has a loose fit with respect to the shaft 201 so as to permit tilting movement thereof. Arranged on the instrument panel 19 is an elongated guide slot 202 through which the control lever 200 extends. On the side of the lever are a series of legends L, F, N, and R corresponding respectively to the Low, Forward Drive, Neutral, and Reverse Drive statuses of the transmission. The Low setting may be utilized for a Grade Retard setting if preferred. To insure that this latter Low setting is not inadvertently established so as to damage the transmission, an offset 203 is provided in the guide slot 202 requiring before establishment of the Low setting that the control lever 200 be shifted sidewise, this being the reason for the tilting movement, before proceeding to Low setting.

The detent cam 40 is connected directly to the control lever 200 through an extension of pin 53, which has a loose fit in a suitable slot 204 in the control lever 200, and of course, the detent cam 40 is connected also at pin 53 to the cable 12. A detent or latch arm denoted at 54' performs in the same manner as the latch arm 54 in the control 10 with respect to the detent cam 40. The tab 57' is urged into engagement with the notches 49, 50, and 51 in the same way, i.e., by spring 56', and a camming pin 58' joined to the latch arm 54' is positioned so as to engage, as viewed in FIGURE 14, a control surface 206 on the control lever 200. This control surface 206 is of irregular configuration with upraised portions 208, 210, and 212 formed therealong.

The structure thus far explained is so related that in moving, e.g., from the Reverse setting towards the Neutral setting, the initial movement of the control lever 200 demands that the camming pin 58' ride over the upraised portion 212, this initial movement being permitted by the loose connection between the pin 53 and the control lever 200. Consequently, the latch arm 54' is moved out of engagement with notch 51, allowing the subsequent movement to the Neutral setting by the Neutral centering spring device 64, which functions in the same manner as previously described to rotate the detent cam 40 to the Neutral setting and accordingly the control lever 200. In proceeding to the Forward drive setting, the upraised portion 210 moves the latch arm 54' out of engagement with the detent cam control surface 48 and then permits the tab 57' to engage notch 50. Movement from the Forward setting to the Low setting only requires that the control lever 200 be tilted slightly as mentioned and then rotated until the tab 57' engages notch 49. Moving the control lever 200 back to the Forward setting will initially, due to the upraised portion 208, force the tab 57' out of the notch 49 sufficiently far to permit the Netural centering spring device 64 to rotate the detent cam 40 until the notch 50 corresponding to the Forward setting is engaged. When moving out of the Forward setting, the upraised portion 210 is effective.

This modification also includes a somewhat different cancellation slide, and hence assigned the numeral 90'. As can be seen in FIGURE 12, the cancellation slide 90' has an elongated slot in the intermediate portion thereof in engagement with and suitably retained on an end of the shaft 201. At one end of slide 90' a window 216 is provided and is arranged to receive the latch arm tab 57'. At the opposite end, the slide 90' has joined thereto an actuator 218 that is in turn pivotally attached at 219 to the housing of an ignition lock member, denoted generally at 220. The relationship between the ignition lock member 220 and the actuator 218 is such that the actuator 218 is caused to revolve about point 219 when the ignition lock member 220 is revolved to the Off position. The rotation of the actuator 218 causes the cancellation slide 90' to be moved to the left, as seen in FIGURE 12, forcing the latch arm 54', due to the engagement of the edge of the window 216 with the tab 57', out of engagement with the detent cam surface 48. This permits the Neutral centering spring device 64 to return the detent cam 40 and accordingly the control lever 200 to the Neutral setting. Preferably, when the ignition lock member 220 is turned slightly further, an engine starting motor circuit 222 is completed to start the engine in a manner well known.

Another feature of the control 10' is the inclusion of a separate transmission parking brake lever 223 as displayed in FIGURE 12. Parking brake lever 223 is pivoted at 224 on the base plate 18 and has secured thereto a detent actuating lever 226. The detent actuating lever 226 is, in turn, operatively joined to a parking brake detent cam 228 revolvably positioned on pin 55. The connection between the actuating lever 226 and the detent cam 228 is made through a pin 230 secured to lever 226 and an elongated slot 232 in the parking brake detent cam 228.

Hence, as the parking brake lever 223 is pivoted, the detent actuating lever 226 will cause the parking brake detent cam 228 to be revolved in a corresponding direction and operate a parking brake cable 234 joined to the parking brake detent cam at 236. The cable 234 extends to a suitable transmission parking brake (not shown). By the arrangement, when the parking brake lever 223 is in the solid line or Unpark position, the parking brake is disengaged and when in the broken line or Park position the parking brake is engaged. A torsion spring 238 urges the detent cam 228 clockwise as viewed in FIGURE 12 and accordingly the parking brake lever 223 to the parking brake disengaged position.

To maintain the parking brake lever 223 in the Park position, the detent cam 228 is provided with a cam surface 240 that has a stop or notch 242 formed therein. This control surface 240 coacts with a tab 244 on a detent arm 245 revolvably supported on shaft 201 in a way similar to that of the detent arm 54'. To urge the tab 244 into engagement with the cam surface 240, a torsion spring 246 is employed.

The detent arm 245 is moved out of engagement or released with respect to the cam surface 240 by the tapered end 248 of the detent actuating lever 226 as portrayed in FIGURE 12. Hence, when the parking brake lever 223 is in the FIGURE 12 disengaged position, the detent arm 245 is forced away from the detent cam 228, thereby allowing the torsion spring 238 to revolve the detent cam 228 to the corresponding setting so as to complete the movement of the parking brake lever 223 to the disengaged position. When the parking brake lever 223 is moved to the Park position, seen in FIGURE 14, the tapered end 248 is withdrawn and the pin 230 will cause the detent cam 228 to revolve until the detent arm tab 244 engages notch 242. This rotation, of course, will actuate the parking brake cable 234 and engage the parking brake.

For locking the parking brake lever 223 in the Park position, a locking device 250, depicted in FIGURES 13 and 15 is employed. This device 250 comprises a carrier lever 252 pivoted to the base plate 18 at 254. Coacting with the lever 252 and also pivoted at 254, is a latch arm 256, which is maintained in the solid line position with respect to the lever 252 by a torsion spring 258. Also, a tension spring 260 biases the lever 252 and the latch arm 256 out of the path of movement of the parking brake lever 223.

To move the lever 252 and the latch arm 256 into the path of movement of the parking brake lever 223, a plunger, denoted at 262 is maneuvered through a suitable connection with the ignition lock member 220 so that when the member 220 is rotated to the Off or Lock position, the lever 252 is moved to the FIGURE 15 setting. Then, if the transmission parking brake lever 223 is not in the Park position, when it is moved to this position, the edge of the lever 223 will engage the nose portion 264 of the latch arm 256 and move the latch arm 256 so that the lever 223 can be placed in the Park position. Moving it out of the Park position is now not possible because the latch arm 256 embraces the edge of lever 223 and prevents movement to the Unpark position. It is possible without actuating the ignition lock member 220 to maneuver a finger tab 266 on the latch arm 256 to the broken line position and free the parking brake lever 223 for movement to the Unpark position.

Another significant aspect of the parking brake lever construction is that when the parking brake lever 223 is maneuvered to the Park position, a finger portion 268 upstanding from the detent cam 228 will engage an extension 270 on the latch arm 54' and force it out of engagement with the detent cam 40. Consequently, the Neutral centering spring device 64 will return the control lever 200 to the Neutral setting prior to establishment of the Park position.

The parking brake lever 223 including the lock device 250 and its relationship to the member 220 as well as the feature of causing the detent cam 40 to be moved to the Neutral setting when the parking brake lever 223 is moved to the Park position, may also be incorporated in the control 10. Also, the arrangement of the cancellation slide 90' relative to the member 220 may be included in the construction of control 10. On the other hand, the switch device 106 employed with the control 10 can be incorporated in the control 10'.

From the foregoing it can be seen that the controls 10 and 10' have many desirable features and provide a conveniently accessible control that is easily manipulated by the operator. The cancellation feature insures that Neutral is established especially before starting the engine. Also, as a safety precaution, the parking brake lever may be locked in the Park position so that the parking brake lever cannot inadvertently be moved out of the Park position.

The invention is to be limited only by the following claims:

1. In a selector control, the combination of an input control member arranged for movement to a series of settings, an output member, means transferring motion between the input and output members, the motion transferring means including a cam member so arranged as to drive connect the input and output members, detent means coacting with the cam member so as to releasably maintain the input member in each of the settings, and means releasing the detent means upon initiation of movement of the input member to a selected setting.

2. In a selector control, the combination of an input control member arranged for movement to a series of settings including an Off setting, an output member, means transferring motion between the input and output members, the motion transferring means including a cam member so arranged as to drive connect the input and output members, detent means coacting with the cam member so as to releasably maintain the input member in each of the settings, the input member including means releasing the detent means, and means urging the input control member to the Off setting upon release of the detent means by the releasing means.

3. In a selector control, the combination of an input control member arranged for movement to a series of settings including an Off setting, an output member, means transferring motion between the input and output members, the motion transferring means including a cam member so arranged as to drive connect the input and output members, detent means coacting with the cam member so as to releasably maintain the input member in each of the settings, and cancellation means operative to release the detent means and cause the input control member to be returned to the Off setting.

4. In a transmission shifter control for a vehicle of the character having an engine starting motor circuit and means to complete said circuit, the combination of an input control member arranged for movement to a series of settings including a Neutral setting, an output member, means transferring motion between the input and output members, the motion transferring means including a cam member so arranged as to drive connect the input and output members, detent means coacting with the cam member so as to releasably maintain the input member in each of the settings, means releasing the detent means upon initiation of movement of the input member, and cancellation means operative initially to release the detent means and cause the input control member to be returned to the Neutral setting and subsequently to effect completion of the engine starting motor circuit.

5. In a selector control, the combination of an input control member arranged for movement to a series of settings, the input control member being provided with a control surface, an output member, means transferring motion between the input and output members, the motion transferring means comprising a cam member adapted to be joined to the output member and so arranged as to be movable by the input member, detent means coacting with the cam member so as to releasably maintain the input member in each of the settings, and releasing means including a releasing element carried by the detent means, the releasing element being arranged to be maneuvered by the control surface on the input member so that upon initiation of movement by the control member to a selected setting the detent means is caused to release the detent means and permit the input member to be moved to a selected setting.

6. In a selector control, the combination of an input control member arranged for movement to a series of settings, the input member being provided with a control surface, an output member, motion transferring means including a cam member connected to the output member and so arranged as to be movable by the input member, the cam member having a cam surface formed thereon provided with stops corresponding to different ones of the input member settings, detent means coacting with the cam member so as to releasably maintain the input member in each of the settings, the detent means including a detent element biased into engagement with the cam member cam surface so as to engage the stops thereon and hold the cam member in the selected setting of the input member, and means releasing the detent means upon initiation of movement of the input member, the releasing means including a releasing element carried by the detent element, the releasing element being arranged to be maneuvered by the input member control surface so that upon initiation of movement of the input control member the detent element is caused to disengage the cam member stops and permit the input member to be maneuvered to a selected setting.

7. In a selector control, the combination of an input control member arranged for movement to a series of settings including an Off setting, the input member being provided with a control surface, an output member, motion transferring means including a cam member adapted to be joined to the output member and so arranged as to be movable by the input member, the cam member having a cam surface formed thereon and provided with stops corresponding to each of the input member settings, detent means releasably maintaining the input member in each of the settings, the detent means including a detent element biased into engagement with the cam member cam surface so as to engage the stops thereon and hold the cam member in the selected setting of the input member, means releasing the detent means upon initiation of movement of the input member, the releasing means including a releasing element carried by the detent element, the releasing element being arranged to be maneuvered by the input member control surface so that upon initiation of movement of the input control member the detent element is caused to disengage the cam member stops and permit the input member to be maneuvered to a selected setting, and biasing means urging the cam member to the Off setting.

8. In a selector control, the combination of an input control member arranged for movement to a series of settings including an Off setting, the input member being provided with a control surface, an output member, motion transferring means including a cam member adapted to be joined to the output member and so arranged as to be movable by the input member, the cam member having a cam surface formed thereon and provided with stops corresponding to each of the input member settings, detent means releasably maintaining the input member in each of the settings, the detent means including a detent element biased into engagement with the cam member cam surface so as to engage the stops thereon and hold the cam member in the selected setting of the input member, means releasing the detent means upon initiation of movement of the input member, the releasing means including a releasing element carried by the detent element, the releasing element being arranged to be maneuvered by the input member control surface so that upon initiation of movement of the input control member the detent element is caused to disengage the cam member stops and permit the input member to be maneuvered to a selected setting, biasing means urging the cam member to the Neutral setting, and cancellation means including a cancellation member operative to move the detent element out of engagement with the cam member stops so as to permit the biasing means to return the input member to the Off setting.

9. In a selector control, the combination of a pair of input control members each being arranged for movement to a series of settings including an Off setting, an output member, means transferring motion between the input control members and the output member, the motion transferring means including a cam member adapted to be joined to the output member and means interconnecting the cam member with each input control member, detent means coacting with the cam member so as to releasably maintain the input control members in the selected settings of each, and means urging the input members towards their respective Off settings.

10. In a selector control, the combination of a pair of input control members each being arranged for movement to a series of settings, an output member, means transferring motion between the input control members and the output member, the motion transferring means including a cam member adapted to be joined to the output member and means interconnecting the cam member with each input control member, detent means coacting with the cam member so as to releasably maintain the input control members in the selected settings of each, and means preventing movement of one of the input members to a different setting when the other input member is in a predetermined setting.

11. In a selector control, the combination of a pair of input control members each being arranged for movement to a series of settings including an Off setting, an output member, means transferring motion between the input control members and the output member, the motion transferring means including a cam member adapted to be drive connected to the output member and means interconnecting the cam member with each input control member, detent means coacting with the cam member so as to releasably maintain the input control members in the selected settings of each, biasing means urging the cam member towards a position corresponding to the Neutral setting of each member, and cancellation means operative to cause each control member to be returned to the Off setting by the biasing means.

12. In a selector control, the combination of a pair of input control members each being arranged for movement to a series of settings including an Off setting, an output member, means transferring motion between the input control members and the output member, the motion transferring means including a cam member adapted to be joined to the output member and means interconnecting the cam member with each input control member, detent means coacting with the cam member so as to releasably maintain the input control members in the selected settings of each, and biasing means urging the cam member towards a position corresponding to the Neutral setting of each member, means so arranged upon urging one of the input members slightly beyond one of the extreme settings thereof as to cause the other of the input members to be returned to the Off setting by the biasing means.

13. In a transmission shifter control for a vehicle of the character having a plurality of accessory systems, the combination of a pair of input control members each being arranged for movement to a series of settings, an output member, means transferring motion between the input control members and the output member, the motion transferring means including a cam member adapted to be joined to the output member and means interconnecting the cam member with each input control member, detent means releasably maintaining the input control members in the selected settings of each, and means rendering certain accessory systems effective in various settings of one of the input control members.

14. In a transmission shifter control, the combination of a pair of manually operable control members each being arranged for movement to a series of settings corresponding to a transmission operating status including a Neutral setting, both control members having control surfaces formed thereon, a transmission operating member for conditioning the transmission for the different operating statuses, means transferring motion between each of the control members and the transmission operating member, the motion transferring means including a cam member having a cam surface thereon provided with stops each corresponding to certain settings of the control members and a follower surface adapted to engage both of the control member control surfaces, means urging the cam member to a position corresponding to the Neutral setting of the control members, and detent means coacting with the cam member so as to releasably maintain the control members in the selected setting of each.

15. In a transmission shifter control, the combination of a pair of manually operable control members each being arranged for movement to a series of settings corresponding to a transmission operating status including a Neutral setting, both control members having control surfaces formed thereon, a transmission operating member for conditioning the transmission for the different operating statuses, means transferring motion between each of the control members and the transmission operating member, the motion transferring means including a cam member having a cam surface thereon provided with stops each corresponding to certain settings of the control members and a follower surface adapted to engage both of the control member control surfaces, means urging the cam member to a position corresponding to the Neutral setting of the control members, a detent member adapted to engage the stops so as to releasably maintain the cam member in a position corresponding to the selected settings of the control members, biasing means urging the detent member into engagement with the cam surface, the control surfaces being adapted to coact with the follower surface so as to prevent movement of one of the control members when the other of the control members is in a selected setting.

16. In a transmission shifter control, the combination of a pair of manually operable control members each being arranged for movement to a series of settings corresponding to a transmission operating status including a Neutral setting, both control members having control surfaces formed thereon, a transmission operating member for conditioning the transmission for the different operating statuses, means transferring motion between each of the control members and the transmission operating member, the motion transferring means including a cam member having a cam surface thereon provided with stops each corresponding to certain settings of the control members and a follower surface adapted to engage both of the control member control surfaces, means urging the cam member to a position corresponding to the Neutral setting of the control members, a detent member adapted to engage the stops so as to releasably maintain the cam member in a position corresponding to the selected settings of the control members, and biasing means urging the detent member into engagement with the cam surface, the control surfaces being adapted to urge the detent member out of engagement with the cam surface upon initial movement of the control members so as to permit movement thereof to the selected setting.

17. In a transmission shifter control for a vehicle of the character having plural accessory operating circuits, the combination of a pair of manually operable control members each being arranged for movement to a series of settings corresponding to a transmission operating status including a Neutral setting, both control members having control surfaces formed thereon, a transmission operating member for conditioning the transmission for the different operating statuses, means transferring motion between each of the control members and the transmission operating member, the motion transferring means including a cam member having a cam surface thereon provided with stops each corresponding to predetermined settings of the control members and a follower surface adapted to engage both of the control member control surfaces, means urging the cam member to a position corresponding to the Neutral setting of the control members, a detent member adapted to engage the stops so as to releasably maintain the cam member in a position corresponding to the selected settings of the control members, biasing means urging the detent member into engagement with the cam surface, and switch means coacting with the cam member and operative to complete one of the accessory operating circuits upon movement of one of the control members to a predetermined setting.

18. In a transmission shifter control, the combination of a pair of manually operable control members, each being arranged for movement to a series of settings corresponding to a transmission operating status including a Neutral setting, both control members having control surfaces formed thereon, a transmission shifter member arranged to condition the transmission for different operating statuses, means transferring motion from the control members to the transmission operating member, the motion transferring means including a cam member having a cam surface thereon provided with stops corresponding to certain settings of the manually operable members and a follower surface adapted to engage the rotatable member control surfaces, a detent member adapted to engage the stops so as to releasably maintain the cam member in a position corresponding to the selected settings of the control members, a spring for urging the detent member into engagement with the cam surface, and an interconnecting member arranged between the detent member and one of the rotatable members so that when said one of the manually operable members is maneuvered beyond one of the extreme settings thereof the detent member is caused to disengage the cam surface and thereby cause the other of the manually operable members to be returned to the Neutral settings.

19. In a transmission shifter control, the combination of a bracket, a pair of control levers rotatably mounted thereon, each lever having a control surface formed thereon, manually operable members mounted on the bracket for rectilinear movement and having connections with the control levers, each manually operable member being maneuverable to a series of settings corresponding to a transmission operating status including a Neutral setting, a transmission shifter member arranged to condition the transmisison for the different operating statuses, means transferring motion from the control levers to the transmission operating member, the motion transferring means including a cam member movably mounted on the bracket and having a cam surface thereon provided with stops corresponding to certain settings of the manually operable members and a follower surface adapted to engage the rotatable lever control surfaces, a detent member positioned on the bracket and adapted to engage the stops so as to releasably maintain the cam member in a position corresponding to the selected settings of the manually operable members, and a spring for urging the detent member into engagement with the cam surface, the control surfaces being adapted to urge the detent member out of engagement with the cam surface upon initial movement of the manually operable members so as to permit further movement thereof to the selected setting.

20. In a transmission shifter control for a vehicle of the character having an engine starting motor circuit, the combination of a bracket, a pair of control levers rotatably mounted thereon, each lever having a control surface formed thereon, manually operable members mounted on the bracket for rectilinear movement and having connections with the control levers, each manually operable member being maneuverable to a series of settings corresponding to a transmission operating status including a Neutral setting, a transmission shifter member arranged to condition the transmission for the different operating statuses, means transferring motion from the control levers to the transmission operating member, the motion transferring means including a cam member movably mounted on the bracket and having a cam surface formed thereon provided with stops corresponding to certain settings of the manually operable members and a follower surface adapted to engage the rotatable lever control surfaces, a detent member rotatably mounted on the bracket and adapted to engage the stops so as to releasably maintain the cam member in a position corresponding to the selected settings of the manually operable members, a spring for urging the detent member into engagement with the cam surface so as to cause the cam member to maintain the manually operable members in the selected setting, the control surfaces being adapted to urge the detent member out of engagement with the cam surface upon initial movement of the manually operable members so as to permit further movement thereof to the selected setting, a cancellation member slidably positioned on the bracket so as to upon initial movement thereof release the detent member and thereby permit the cam member to be returned by the biasing means to a position corresponding to the Neutral setting of the manually operable members and accordingly the manually operable members and upon subsequent movement complete an engine starting motor circuit.

21. In a control, the combination of a manually operable member movable to a series of settings including an Off setting, an output member, means transferring motion of the manually operable member to the output member, the motion transferring means including a cam member arranged so as to operatively interconnect the manually operable member and the output member, the cam member having a cam surface thereon provided with a series of stops corresponding to the settings of the manually operable member, a detent member adapted to engage the stops and releasably maintain the manually operable member in a selected setting, a spring urging the detent member into engagement with the cam surface, the manually operable member having a control surface thereon with portions thereof corresponding to each setting, the portions being so arranged as to engage the detent member and urge the detent member out of restraining engagement with the cam surface upon initial movement of the manually operable member and thereby permit the manually operable member to be moved to a different setting, and biasing means urging the cam member to the Off setting.

22. In a transmission control for a vehicle, the combination of a manually operable member movable to a series of settings including a Neutral setting, an output member, means transferring motion of the manually operable member to the output member, the motion transferring means including a cam member arranged so as to operatively interconnect the manually operable member and the output member, the cam member having a cam surface thereon provided with a series of stops corresponding to the settings of the manually operable member, a detent member adapted to engage the stops and releasably maintain the manually operable member in a selected setting, a spring urging the detent member into engagement with the cam surface, the manually operable member having a control surface thereon with portions thereof corresponding to each setting, the portions being so arranged as to engage the detent member and urge the detent member out of restraining engagement with the cam surface upon initial movement of the manually operable member and thereby permit the manually operable member to be moved to a different setting, biasing means urging the cam member to the Neutral setting, an ignition lock member remotely positioned from the manually operable member and adapted to be moved to On and Off positions, and a cancellation member having a drive connection with the ignition lock member, the cancellation member being adapted when the ignition lock member is moved to the On position to urge the detent member out of restraining engagement with the cam member stops so that the biasing means may return the manually operable member to the Neutral setting.

23. In a control, the combination of a first manually operable member movable to a series of settings including a Neutral setting, an output member, means transferring motion of the manually operable member to the output member, the motion transferring means including a cam member arranged so as to operatively interconnect the manually operable member and the output member, the cam member having a cam surface thereon provided with a series of stops corresponding to the settings of the manually operable member, a detent member adapted to engage the stops and releasably maintain the manually operable member in a selected setting, a spring urging the detent member into engagement with the cam surface, the manually operable member having a control surface thereon with portions thereof corresponding to each setting, the portions being so arranged as to engage the detent member and urge the detent member out of restraining engagement with the cam surface upon initial movement of the manually operable member and thereby permit the manually operable member to be moved to a different setting, biasing means urging the cam member to the Neutral setting, a second manually operable member movable to plural positions and so adapted that upon movement to one position the detent member is caused to move out of engagement with the cam member stops and permit the biasing means to return the first manually operable member to the Neutral setting.

24. In a manual control for a transmission of the character having a parking brake, the combination of a manually operable shifter member having Forward, Neutral, and Reverse settings each corresponding to a transmission operating status, an output shifter member arranged to condition the transmission for the different operating statuses, a manually operable parking brake control member having Park and Unpark positions, a parking brake operating member, a shifter cam member adapted to be joined to the output shifter member and so arranged as to be movable by the manually operable shifter member, the shifter cam member having a cam surface thereon provided with stops corresponding to the Forward and Reverse settings of the manually operable shifter member, a shifter detent member coacting with the stops so as to releasably maintain the shifter cam member in a selected setting, a shifter spring for urging the shifter detent member into engagement with the shifter cam member cam surface, a parking brake cam member drive connected to the parking brake operating member and so arranged as to be movable by the manually operable parking brake control member, the parking brake cam member having a cam surface thereon provided with a stop corresponding to the Park position of the parking brake control member, a parking brake detent member engageable with the parking brake detent cam member surface so as to releasably maintain the parking brake control member in the Park position, a parking brake spring for urging the parking brake detent member into engagement with the parking brake cam member surface, the parking brake control member having a portion thereof adapted to urge the parking brake detent member out of engagement with the parking brake cam member surface when the parking brake control member is moved to the Unpark position, the parking brake cam member also having an actuating portion arranged so as to move the shifter detent member out of engagement with the shifter cam member surface when the parking brake control member is moved to the Park position, and biasing means for urging the shifter cam member and accordingly the manually operable shifter member to the Neutral setting when the shifter detent member is moved out of engagement with the shifter detent cam member.

25. In a manual control for a transmission of the character having a parking brake, the combination of a manually operable shifter member having Forward, Neutral, and Reverse settings each corresponding to a transmission operating status, an output shifter member arranged to condition the transmission for the different operating statuses, a manually operable parking brake control member having Park and Unpark positions, a parking brake operating member, a shifter cam member adapted to be joined to the output shifter member and so arranged as to be movable by the manually operable shifter member, the shifter cam member having a cam surface thereon provided with stops corresponding to the Forward and Reverse settings of the manually operable shifter member, a shifter detent member coacting with the stops so as to releasably maintain the shifter cam member in a selected setting, a shifter spring for urging the shifter detent member into engagement with the shifter cam member cam surface, a parking brake cam member drive connected to the parking brake operating member and so arranged as to be movable by the manually operable parking brake control member, the parking brake cam member having a cam surface thereon provided with a stop corresponding to the Park position of the parking brake control member, a parking brake detent member engageable with the parking brake detent cam member surface so as to releasably maintain the parking brake control member in the Park position, a parking brake spring for urging the parking brake detent member into engagement with the parking brake cam member surface, the parking brake control member having a portion thereof adapted to urge the parking brake detent member out of engagement with the parking brake cam member surface when the parking brake control member is moved to the Unpark position, the parking brake cam member also having an actuating portion arranged so as to move the shifter detent member out of engagement with the shifter cam member surface when the parking brake control member is moved to the Park position, biasing means for urging the shifter cam member and accordingly the manually operable shifter member to the Neutral setting when the shifter detent member is moved out of engagement with the shifter detent cam member, and a locking device for maintaining the parking brake control member in the Park position.

26. In a control for a vehicle transmission parking brake, the combination of a bracket, a manually operable parking brake control member pivotally mounted on the bracket for movement to Park and Unpark settings, a parking brake operating member adapted to engage and disengage the parking brake respectively in the Park and Unpark positions of the control member, an ignition lock member remotely positioned from the control member, a locking latch member pivotally mounted on the bracket adjacent the control member and arranged to lock the control member in the Park position when actuated, a spring for urging the locking latch member out of locking engagement with the control member, and a plunger interposed between the locking latch member and the ignition lock member and so arranged that when the ignition lock member is moved to the Off position the locking latch member is actuated so as to lock the control member in the Park position.

27. In a control for a vehicle transmission parking brake, the combinatioin of a bracket, a manually operable parking brake control member pivotally mounted on the bracket for movement to Park and Unpark positions, a parking brake operating member adapted to engage and disengage the parking brake respectively in the Park and Unpark positions of the control member, an ignition lock member remotely positioned from the control member, a carrier member pivotally mounted on the bracket adjacent the control member for movement to lock and unlock positions, a latch member arranged for yieldable movement relative to the carrier, the latch member in lock position of the carrier permitting the control member to be moved to the Park position and preventing the control member to be moved from the Park position and in the unlock position of the carrier permitting movement of the control member to and from the Park position, a spring for urging the carrier member to the unlock position, and a plunger interposed between the locking latch member and the ignition lock member and so arranged that when the ignition lock member is moved to the Off position the carrier member is moved to the lock position.

28. In a control for a transmission having a parking brake, the combination of a manually operable shifter member having Forward, Neutral, and Reverse settings each corresponding to a transmission operating status, an output member arranged to condition the transmission for the different operating statuses, a manually operable parking brake control member having Park and Unpark positions, a parking brake operating member, means transferring motion from the shifter member and the parking brake control member respectively to the output member and the parking brake operating member, and means at times causing the shifter member to be placed in the Neutral setting and at other times locking the parking brake control member in the Park position.

29. In a control for a transmission having a parking brake, the combination of a manually operable shifter member having Forward, Neutral, and Reverse settings each corresponding to a transmission operating status, an output member arranged to condition the transmission for the different operating statuses, a manually operable parking brake control member having Park and Unpark positions, a parking brake operating member, means transferring motion from both the shifter member and the parking brake control member respectively to the output member and the parking brake operating member, detents for the shifter and parking brake control member each so arranged as to releasably maintain the associated member respectively in the operative settings and positions thereof, and means operated by the parking brake control member and so arranged as to render inoperative the detent for the shifter member when the parking brake control member is moved to the Park position thereby permitting the shifter member to be returned to the Neutral setting.

30. In a control for a transmission having a parking brake, the combination of a manually operable shifter member having Forward, Neutral, and Reverse settings each corresponding to a transmission operating status, an output member arranged to condition the transmission for the different operating statuses, a manually operable parking brake control member having Park and Unpark positions, a parking brake operating member, means transferring motion from the shifter member and the parking brake control member respectively to the output member and the parking brake operating member, and an ignition locking member remotely positioned from the shifter member, the locking member being so arranged when moved to the ignition Off position as to cause the parking brake control member to be locked in the Park position thereof.

References Cited in the file of this patent
UNITED STATES PATENTS

| | | |
|---|---|---|
| 1,735,542 | Monday | Nov. 12, 1929 |
| 2,015,834 | Banker | Oct. 1, 1935 |
| 2,550,403 | Carmichael | Apr. 24, 1951 |
| 2,635,722 | Wemp | Apr. 21, 1953 |
| 2,812,837 | Khan | Nov. 12, 1957 |
| 2,847,871 | Schick | Aug. 19, 1958 |
| 2,897,685 | Thannhauser | Aug. 4, 1959 |
| 2,911,842 | Romi | Nov. 10, 1959 |
| 2,970,679 | Suller et al. | Feb. 7, 1961 |
| 3,001,618 | McCordic et al. | Sept. 26, 1961 |

UNITED STATES PATENT OFFICE
CERTIFICATE OF CORRECTION

Patent No. 3,107,762            October 22, 1963

Benjamin N. Snyder et al.

It is hereby certified that error appears in the above numbered patent requiring correction and that the said Letters Patent should read as corrected below.

Column 3, line 64, for "pan" read -- pin --; column 4, line 34, for "and" read -- at --; line 37, after "ear" insert -- 98 --; column 6, line 49, for "of" read -- on --; column 10, line 43, after "member" insert -- drive --; column 16, line 10, for "surfac" read -- surface --.

Signed and sealed this 28th day of April 1964.

(SEAL)
Attest:

ERNEST W. SWIDER
Attesting Officer

EDWARD J. BRENNER
Commissioner of Patents